H. HUCULAK.
BABY CARRIAGE.
APPLICATION FILED JAN. 13, 1920.
1,350,806.
Patented Aug. 24, 1920.
2 SHEETS—SHEET 1.
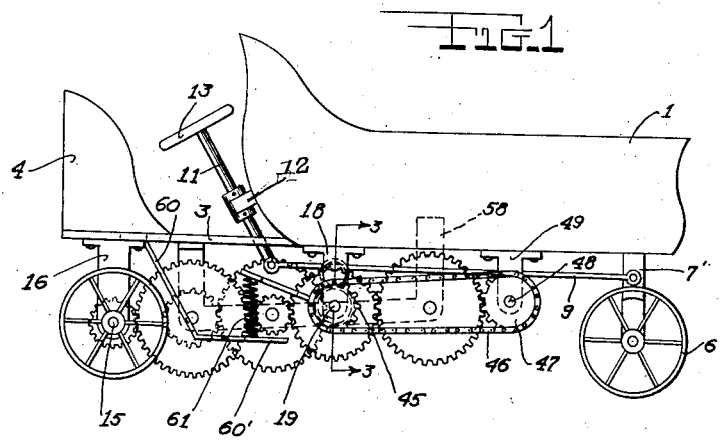
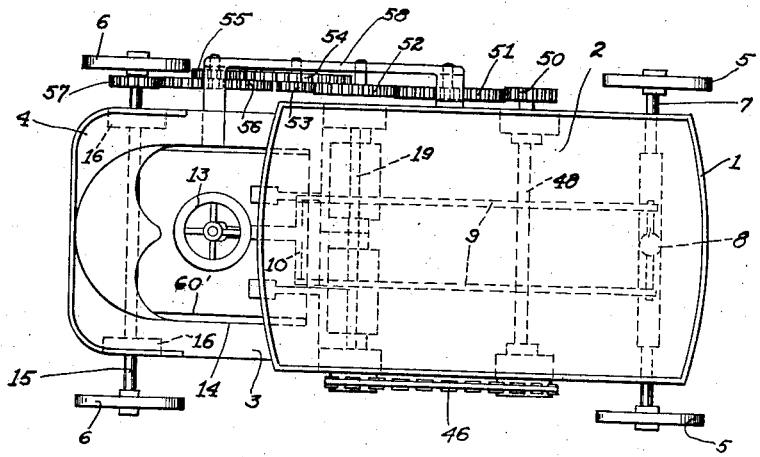
INVENTOR.
Hryhoryj Huculak
BY
George C. Heinick
ATTORNEY.

H. HUCULAK.
BABY CARRIAGE.
APPLICATION FILED JAN. 13, 1920.
1,350,806.
Patented Aug. 24, 1920.
2 SHEETS—SHEET 2.
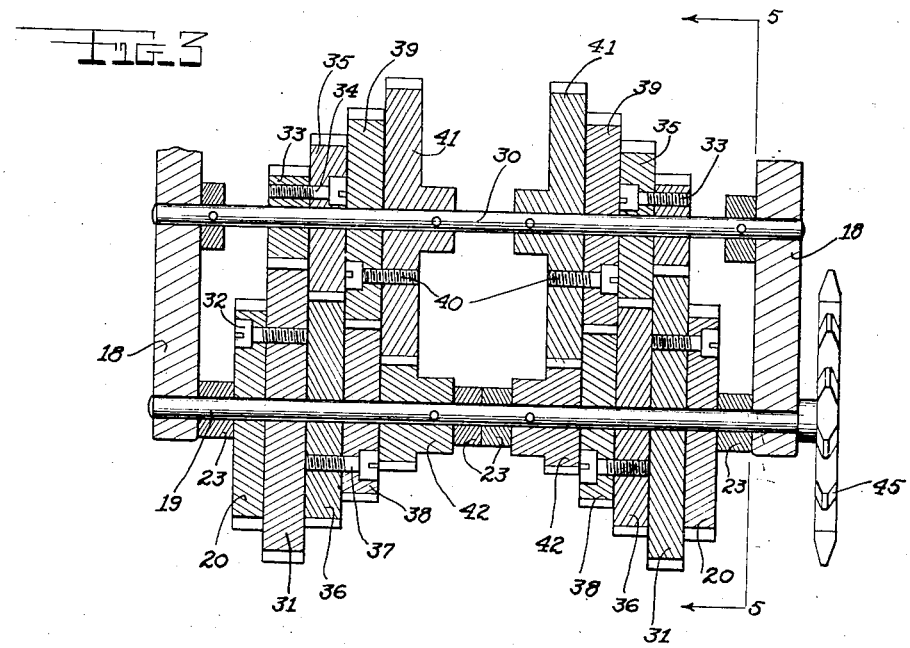
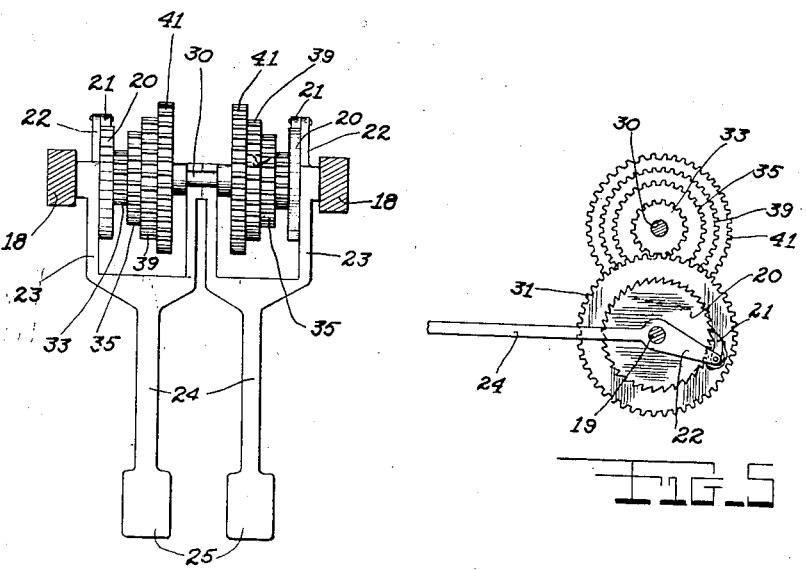
INVENTOR.
Hryhoryj Huculak
BY
ATTORNEY.

UNITED STATES PATENT OFFICE.

HRYHORYJ HUCULAK, OF CLEARING, ILLINOIS.

BABY-CARRIAGE.

1,350,806. Specification of Letters Patent. Patented Aug. 24, 1920.

Application filed January 13, 1920. Serial No. 351,170.

*To all whom it may concern:*

Be it known that I, HRYHORYJ HUCULAK, a citizen of Ukrainia, residing at Clearing, county of Cook, and State of Illinois, have invented certain new and useful Improvements in Baby-Carriages, of which the following is a specification.

This invention relates to baby carriages and it has for an object to provide a novel and improved construction and arrangement of parts whereby the baby carriage may be mechanically propelled by the person in charge thereof who may be seated on an extra seat provided in conjunction therewith.

For further comprehension of the invention, and of the objects and advantages thereof, reference will be had to the following description and accompanying drawings, and to the appended claims in which the various novel features of the invention are more particularly set forth.

Figure 1 of the drawings is a side view of a baby carriage embodying the invention.

Fig. 2 is a plan view thereof.

Fig. 3 is an enlarged detail vertical section taken on the line 3—3 of Fig. 1.

Fig. 4 is a detail horizontal section showing the foot pedals and a portion of the transmission gearing.

Fig. 5 is a transverse section on the line 5—5 of Fig. 3.

As here shown the baby carriage comprises a body 1 the floor 2 whereof is formed with a rearward extension 3, the interior of the body 1 being suitably upholstered or fitted to receive the baby while the rear portion of the extension is formed with a seat 4 to accommodate the person in charge, or operator. The carriage is supported on a front pair of wheels 5 and a rear pair 6, the former being rotatable on a shaft 7 fixed in an axle member 7' pivoted centrally between opposite sides of the carriage to the floor of the latter by means of a suitable king bolt indicated at 8. A pair of rigid parallel rods 9 are pivotally connected at their front ends to opposite sides of the member 7' and extend rearwardly under the floor to connect at their rear ends to opposite ends of a cross arm 10 fixed to a rearwardly inclined steering post 11 journaled in a bracket 12 fixed to the carriage body and having a hand-wheel 13 on its upper end, this steering post extending upwardly through an opening 14 in the rear extension 3 of the floor which opening also accommodates the legs of the operator as will be later pointed out. The rear wheels 6 are fixed on a shaft 15 journaled in bearings 16 under the seat 4.

Secured to the floor 2 under the rear portion of the body 1 of the carriage are a pair of bearings 18 in which a transverse shaft 19 is journaled. Loosely mounted on this shaft near opposite ends thereof are a pair of ratchet wheels 20 engaged by spring pressed pawls 21 carried on arms 22 extending rigidly from the outer forks of a pair of yokes 23 pivoted at their ends upon the shaft 19, these yokes having integral rearwardly extending arms 24 provided on their ends with foot pedals 25. When the foot pedals are depressed rotary motion will be imparted to the shaft 19 through a multiplying gear train arranged in two units (one for each pedal) mounted in part on the shaft 19 and in part on a second transverse shaft 30 journaled in the brackets 18 above the shaft 19.

Each unit of this gear train comprises a spur gear 31 loose on shaft 19 and fixed as by screws 32 each to the adjacent ratchet wheel 20.

This gear 31 meshes with a second smaller gear 33 loose on shaft 30 and fixed as by screws 34 to a larger gear 35 loose on shaft 30. Gear 35 meshes with a fourth gear 36 loose on shaft 19, and fixed as by screws 37 to a fifth gear 38 loose on shaft 19. Gear 38 meshes with a sixth gear 39 loose on shaft 30 and fixed as by screws 40 to a large gear 41 which may be tight on shaft 30, this latter gear meshing with a pinion 42 fixed upon shaft 19. It will be apparent then that when either of the ratchet wheels 20 is rotated motion will be imparted at an increased speed ratio to the shaft 19. This shaft is operatively connected to the shaft 15 on which the rear wheels are mounted by the following means.

Upon the end of this shaft 19 is fixed a sprocket wheel 45 over which is looped a chain 46 which engages also a second sprocket wheel 47 on the end of another transverse shaft 48 supported in brackets 49 under the body in front of shaft 19. Upon the opposite end of this shaft 48 is fixed a spur gear 50 meshing with an idler 51 which meshes in turn with another idler 52 which latter meshes with a pinion 53 fixed co-axially to a gear 54. Gear 54 meshes with a pinion 55 fixed co-axially to a gear 56, the latter engaging a pinion 57 fixed on the shaft 15. The intermediate gears of this train may be supported in an auxiliary side frame member 58 fixed to the frame of the carriage.

Fixed to the underside of the floor extension 3 are a pair of angular straps 60 having horizontal portions 60' upon which rest expansion springs 61 adapted to automatically raise the pedals 25.

It is believed that the manner in which my improved baby carriage is propelled will be apparent from the above description. The legs of the operator extend down through the opening 14 and engage the pedals 25, the operator being seated in the seat 4. When the pedals are depressed movement is imparted through the gear train above described, at a greatly increased speed ratio, to the shaft 15 on which the rear wheels 6 are fixed, causing the latter to revolve and the carriage to be propelled forward, traveling a considerable distance upon each operation of the pedal. When the operator's foot is raised the spring 61 raises the pedal, the pawl 21 riding back over the ratchet wheel 20. By turning the steering wheel 13 the front wheels are directed to one side or the other, as may be desired, to steer the carriage.

Having thus described my invention what I claim as new and desire to secure by Letters Patent of the United States is as follows—

1. A baby carriage, comprising a body, front and rear wheels, the floor of said body having a rearward extension provided with an aperture for the legs of the operator, an operator's seat at the rear of said aperture, reciprocatory foot pedals below said aperture, gear trains operatively connecting said foot pedals with the rear wheels of the carriage, a pair of angular straps fixed to the said extension and having portions extending under the said pedals, and springs resting on said straps and acting to move said pedals upwardly.

2. A baby carriage comprising a body, front and rear wheels, the floor of said body having a rearward extension provided with an aperture for the legs of the operator, reciprocatory foot pedals below said aperture, a transverse shaft on which said foot pedals are pivoted, ratchet wheels loose upon said shaft, pawls carried by said pedals, and engaging said ratchet wheels, a second transverse shaft mounted above the first shaft, a pair of multiplying trains of gears carried partly by each shaft whereby movement is imparted from the said ratchet wheels to the first shaft, and an operative connection between said shaft and the rear wheels, said connection comprising a sprocket wheel fixed to the end of said shaft, a sprocket chain looped over said sprocket wheel, a second sprocket wheel over which said chain is also looped; a transverse shaft arranged in front of the first shaft on which said second sprocket wheel is fixed, and a train of multiplying gears extending between said last shaft and the rear wheel shaft.

In testimony whereof I have affixed my signature.

HRYHORYJ HUCULAK.